(12) United States Patent
Nam et al.

(10) Patent No.: US 10,253,542 B2
(45) Date of Patent: Apr. 9, 2019

(54) OVER SLAM BUMPER ASSEMBLY

(71) Applicants: Hyundai Motor Company, Seoul (KR); Kia Motors Corporation, Seoul (KR)

(72) Inventors: Yong Hyun Nam, Gunpo-si (KR); Jun Ho Lee, Yongin-si (KR); Dong Min Jeon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/707,831

(22) Filed: Sep. 18, 2017

(65) Prior Publication Data

US 2018/0291667 A1 Oct. 11, 2018

(30) Foreign Application Priority Data

Apr. 6, 2017 (KR) .................. 10-2017-0044744

(51) Int. Cl.
*B60J 5/04* (2006.01)
*E05F 5/02* (2006.01)

(52) U.S. Cl.
CPC ............ *E05F 5/025* (2013.01); *B60J 5/0468* (2013.01); *E05Y 2900/531* (2013.01)

(58) Field of Classification Search
CPC ........ B60J 5/0468; B60J 5/0413; B60J 5/042; B60J 5/0429; B60J 5/0437; E05F 5/022; E05F 5/025; E05Y 2900/531

USPC .................................................... 296/146.6
See application file for complete search history.

(56) References Cited

U.S. PATENT DOCUMENTS

| 1,947,524 | A | * | 2/1934 | Horldt | E05F 5/025 16/85 |
| 2006/0230686 | A1 | * | 10/2006 | Plum | B60J 5/0405 49/498.1 |
| 2007/0234527 | A1 | * | 10/2007 | Aoyama | E05F 5/022 24/297 |
| 2014/0091600 | A1 | * | 4/2014 | Lusky | E05F 5/022 296/207 |
| 2014/0300133 | A1 | * | 10/2014 | Hinokio | B60R 13/0206 296/146.7 |
| 2016/0305174 | A1 | * | 10/2016 | Swann | E05F 5/022 |
| 2017/0016262 | A1 | * | 1/2017 | Kwak | E05F 5/022 |

FOREIGN PATENT DOCUMENTS

| JP | H 08-58371 A | 3/1996 |
| JP | H 09-272387 A | 10/1997 |
| JP | 2003-025844 A | 1/2003 |
| JP | 2004-256003 A | 9/2004 |
| JP | 2007-161043 A | 6/2007 |
| JP | 2009-023573 A | 2/2009 |
| JP | 2010-000830 A | 1/2010 |

* cited by examiner

*Primary Examiner* — Gregory A Blankenship
(74) *Attorney, Agent, or Firm* — Morgan, Lewis & Bockius LLP

(57) ABSTRACT

An over slam bumper assembly includes a reinforcement member mounted on a door panel, and an over slam bumper including a first portion disposed between the door panel and the reinforcement member and a second portion disposed between the door panel and a vehicle body to contact the vehicle body when a door is closed.

11 Claims, 7 Drawing Sheets

OVER SLAM BUMPER ASSEMBLY

CROSS-REFERENCE TO RELATED APPLICATION

The present application claims priority to Korean Patent Application No. 10-2017-0044744, filed on Apr. 6, 2017, the entire contents of which is incorporated herein for all purposes by this reference.

BACKGROUND OF THE INVENTION

Field of the Invention

The present invention relates to an over slam bumper assembly.

Description of Related Art

In general, a door of a vehicle includes a reinforcement member for reinforcing the strength of a door panel, and an over slam bumper for alleviating an impact and noise that are generated when the door is closed.

The reinforcement member has a beam structure, and is mounted in the internal of the door panel in a lengthwise direction of the vehicle. The over slam bumper is formed of an elastic material that may be elastically deformed, and is mounted on the door panel to face the vehicle body. Further, a recessed contact part is formed in the vehicle body such that the over slam bumper elastically contacts the contact part when the door is closed.

However, when a quality defect or other defects occur in the reinforcement member, an intrusion degree by which the door intrudes into the internal of the vehicle (hereinafter, referred to as effects occur in the reinforcement member, an intrusion degree by which the door intrudes into the internal of bumper is formed of an elastic material that may be elastically deformed, and is mounted to passengers.

To solve this, a method for installing a hook provided to be stopped by a stopping recess formed in the vehicle body in the door panel to reduce an intrusion degree of the door has been used However, the hook increases the manufacturing costs and weight of the vehicle and badly influences an external design of the vehicle due to the stopping recess.

Further, the over slam bumper badly influences the external design of the vehicle as the contact part is exposed to the outside when the door is opened.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an over slam bumper assembly that has an improved structure to reduce the manufacturing costs and weight of a vehicle.

Various aspects of the present invention are directed to providing an over slam bumper assembly that has an improved structure to reduce an intrusion degree of a door when a lateral collision occurs.

Various aspects of the present invention are directed to providing an over slam bumper assembly that improves an external design of a vehicle.

The technical objects of the present invention are not limited to the above-mentioned one, and the other unmentioned technical objects will become apparent to those skilled in the art from the following description.

In accordance with an aspect of the present invention, there is provided an over slam bumper assembly including a reinforcement member mounted on a door panel, and an over slam bumper including a first portion disposed between the door panel and the reinforcement member and a second portion disposed between the door panel and a vehicle body to contact the vehicle body when a door is closed.

The over slam bumper may further include a third portion connecting the first portion and the second portion and inserted into a first insertion hole formed in the door panel.

The third portion may have a first insertion groove formed on an external peripheral surface thereof such that an internal peripheral surface of the first insertion hole is fitted with and coupled to the external peripheral surface of the third part.

The over slam bumper assembly may further include a coupling member coupling the over slam bumper and the door panel.

The coupling member may include a bolt screw-coupling the over slam bumper and the door panel.

The reinforcement may include a first bolt hole punched such that a screw part of the coupling member is coupled to the first bolt hole, and the over slam bumper may include a second bolt hole punched such that the screw part of the coupling member is coupled to the second bolt hole.

The over slam bumper may be formed of an elastic material that is elastically deformed.

The over slam bumper assembly may further include a support member mounted on the vehicle body to contact the second portion when the door is closed.

The support member may be mounted in a second insertion hole formed in the vehicle body to be separable from the second insertion hole.

The support member may include at least one stopping hook formed on one surface thereof to be coupled to an internal peripheral surface of the second insertion hole to be stopped.

The second portion may have a second insertion groove formed on an external peripheral surface thereof such that an internal peripheral surface of the second insertion hole is fitted with and coupled to the external peripheral surface of the support member.

The second portion may have an external diameter that is the same as or smaller than an internal diameter of the second insertion hole.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
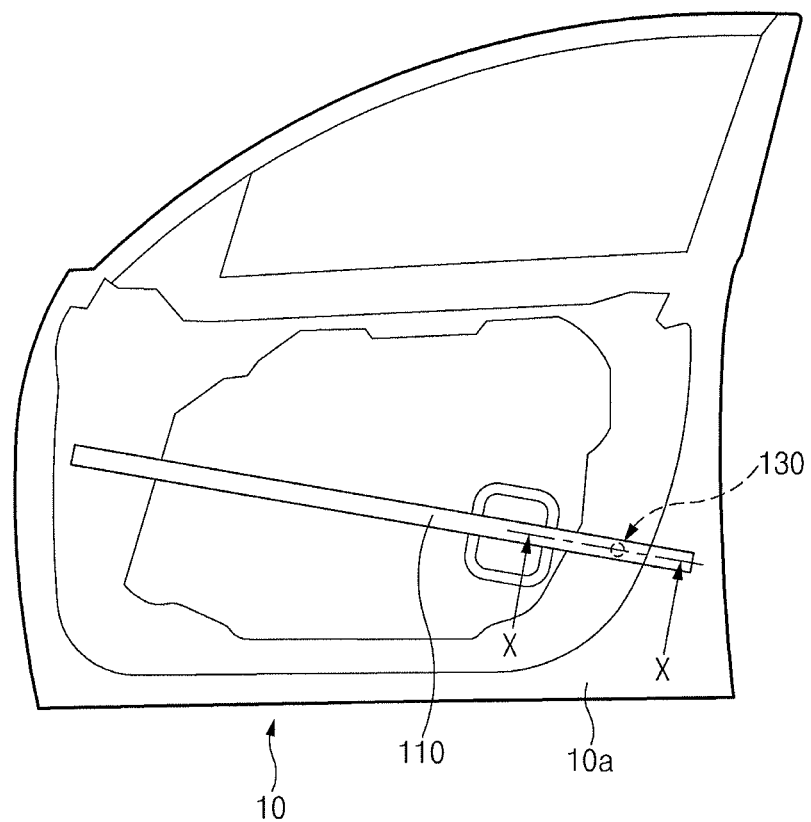
FIG. 1 is a view illustrating a state in which an over slap bumper assembly according to an exemplary embodiment of the present invention is mounted to a vehicle.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. Throughout the specification, it is noted that the same or like reference numerals denote the same or like components even though they are provided in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

Figure 2:
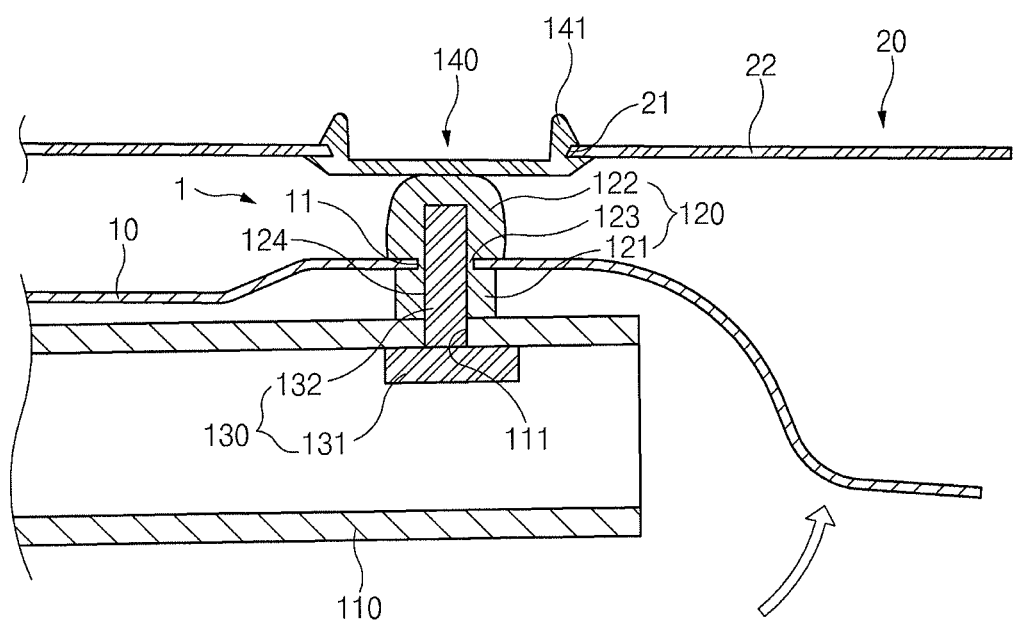
FIG. 2 is a sectional view taken along line X-X of FIG. 1, which illustrates a state in which a door of the vehicle of FIG. 1 is closed.

FIG. 1 is a view illustrating a state in which an over slap bumper assembly according to an exemplary embodiment of the present invention is mounted to a vehicle. FIG. 2 is a sectional view taken along line X-X of FIG. 1, which illustrates a state in which a door of the vehicle of FIG. 1 is closed.

As illustrated in FIG. 1 and FIG. 2, the over slam bumper assembly 1 of the present invention may include a reinforcement member 110 mounted on a door panel 10, an over slap bumper 120 disposed between the reinforcement member 110 and a vehicle body, a coupling member 130 configured to couple the reinforcement member 110 and the over slap bumper 120, and a support member 140 configured to support the over slap bumper 120.

First, the reinforcement member 110 is a member for reinforcing a strength of a door of the vehicle (hereinafter, a door).

The reinforcement member 110 has an impact beam structure having a circular or polygonal pipe shape, and is mounted in the internal of the door panel 10 along a lengthwise direction of the vehicle body 20. However, the shape and mounting locations of the reinforcement member 110 are not limited thereto.

Here, the door panel 10 is a member including an internal panel 10a and an external panel to form an external appearance of the door, and is mounted to the door to face a side external member 22 of the vehicle body 20 when the door is closed. The door panel 10 includes a first insertion hole 11 that is punched such that the over slam bumper 120, which will be described below, is inserted into the first insertion hole 11.

The vehicle body 20 is a member forming an external appearance of the vehicle, and the side external member 22 forms a side surface of the vehicle body 200. Further, the side external door 22 has a second insertion hole 21 that is punched such that the support member 140, which will be described below, is inserted into the second insertion hole 21.

The reinforcement member 110 includes a first bolt hole 111 that is punched such that a screw part 131 of the coupling member 130, which will be described below, is inserted into the first bolt hole 111. A screw thread that may be coupled to a screw thread of the screw part 131 is formed on an internal peripheral surface of the first bolt hole 111.

When a collision target object including another travelling vehicle or a collision test target object, collides a side surface of the vehicle, on which the over slap bumper assembly 1 is mounted, the reinforcement member 110 enhances a safety of a passenger by absorbing impact energy applied by the collision target object.

Figure 3:
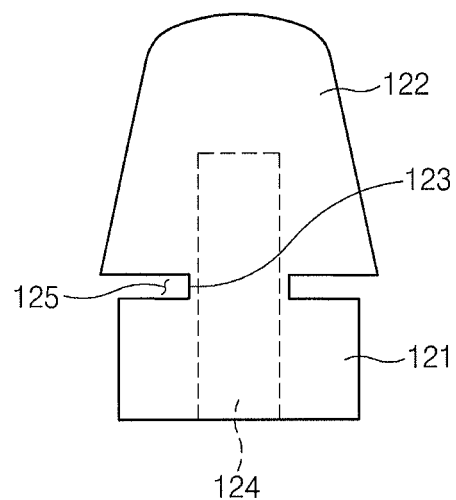
FIG. 3 is a front view of the over slap bumper of FIG. 2.
Figure 4:
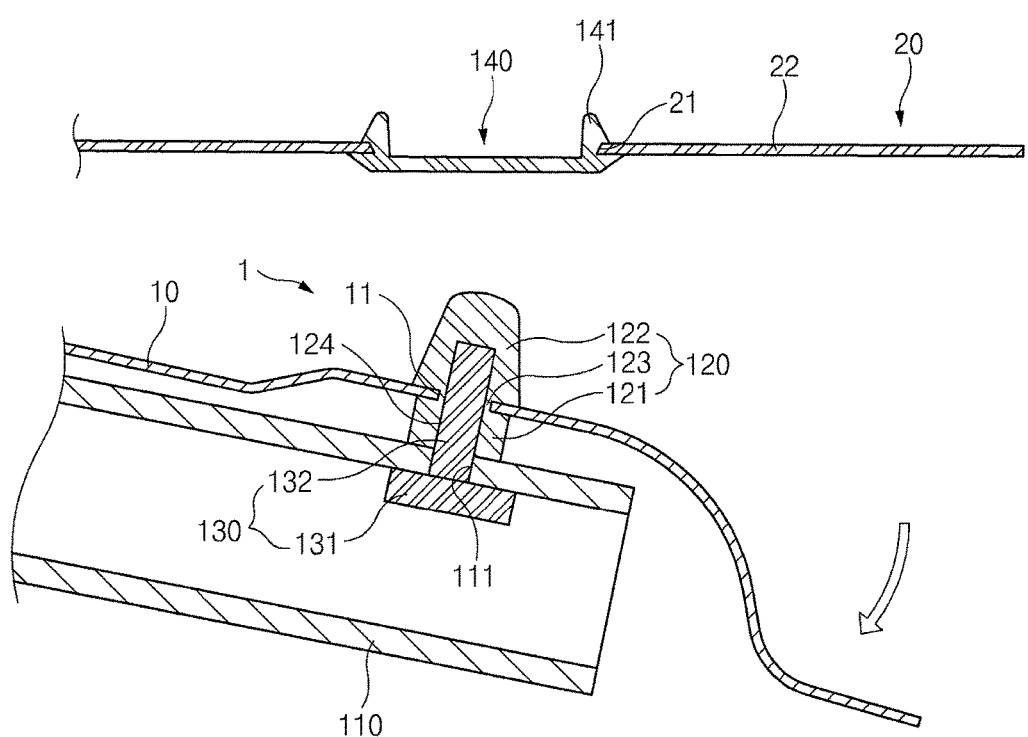
FIG. 4 is a sectional view taken along line X-X of FIG. 1, which illustrates a state in which a door of the vehicle of FIG. 1 is opened.
Figure 5:
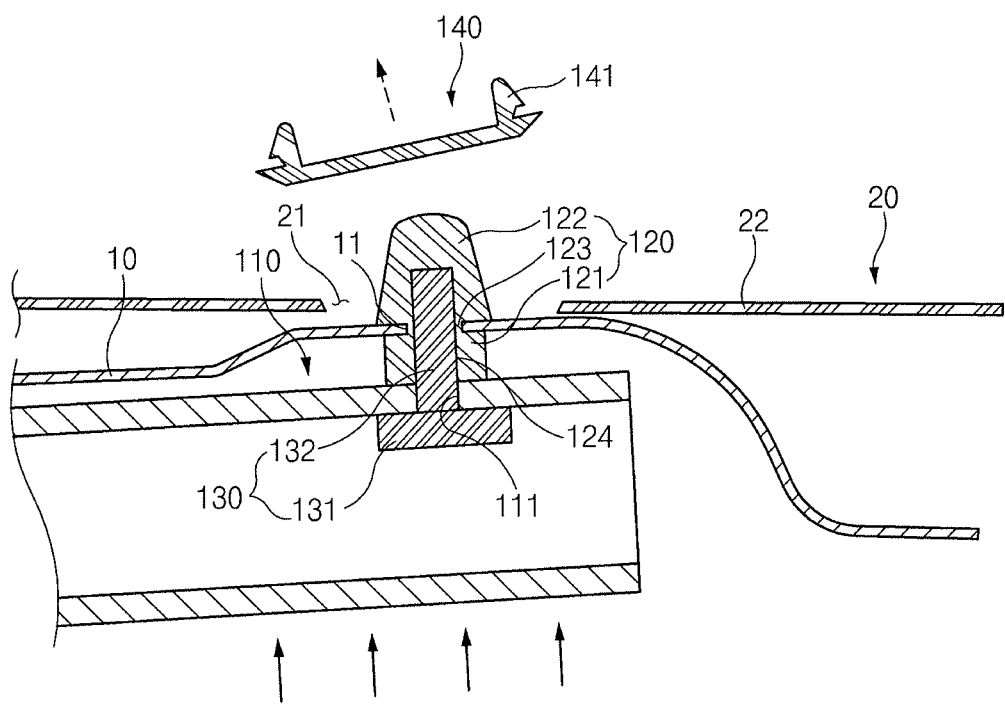
FIG. 5 is a sectional view taken along line X-X of FIG. 1, which illustrates a state in which a lateral collision occurs on a side surface of the door of the vehicle of FIG. 1.

FIG. 3 is a front view of the over slap bumper of FIG. 2. FIG. 4 is a sectional view taken along line X-X of FIG. 1, which illustrates a state in which a door of the vehicle of FIG. 1 is opened. FIG. 5 is a sectional view taken along line X-X of FIG. 1, which illustrates a state in which a lateral collision occurs on a side surface of the door of the vehicle of FIG. 1.

Next, the over slam bumper 120 is a member for reducing an intrusion degree of the reinforcement member 110 when a lateral collision occurs.

The structure of the over slap bumper 120 is not specifically limited. For example, the over slap bumper 120 may include a first portion 121 disposed between the door panel 10 and the reinforcement member 110, a second portion 122 disposed between the door panel 10 and the vehicle body 20 to contact the vehicle body 20 when the door is closed, a third portion 123 connecting the first portion 121 and the second portion 122, and a second bolt hole 124, to which the coupling member 130, which will be described below, is coupled. The over slam bumper 120 may be formed of an elastic material to alleviate an impact and noise when the door is closed.

The first portion 121 is located between the reinforcement member 110 and the door panel 10. The first portion 121 is fixed to the reinforcement member 110 by the coupling member 130, which will be described below.

The second portion 122 is located between the door panel 10 and the side external member 22. As illustrated in FIGS. 2 and 4, the second portion 122 has a specific size to elastically contact the support member 140, which will be described below, only when the door is closed, and not to contact the support member 140 when the door is opened. As illustrated in FIG. 5, the second portion 122 has an external diameter that is the same as or smaller than the internal diameter of the second insertion hole 21 such that the second portion 122 may be inserted into the second hole 21 when the support member 140 is separated from the second insertion hole 21 of the side external member 22.

The third portion 123 is formed between the first portion 121 and the second portion 122 to connect the first portion 121 and the second portion 122, and is inserted into the first insertion hole 11 of the door panel 10. The third portion 123 has a first insertion groove 123 such that the internal peripheral surface of the first insertion hole 11 may be fitted with and coupled to the external peripheral surface of the third portion 123. The over slam bumper 120 is mounted on the door panel 10 through the insertion coupling.

The second bolt hole 124 is punched at a lower portion of the over slam bumper 120 to couple the screw part 132 of the coupling member 130, which will be described below. As illustrated in FIG. 2, the second bolt hole 124 extend from a bottom surface of the first portion 121 to an intermediate part of the second portion 122, but the present invention is not limited thereto.

A screw thread that may be coupled to a screw thread of the screw part 132 is formed on an internal peripheral surface of the second bolt hole 124. As such, as illustrated in FIG. 2, the reinforcement member 110 and the over slam bumper 120 may be screw-coupled to each other by coupling the screw part 132 of the coupling member 130, which passed through the first bolt hole 111, to the second bolt hole 124.

Next, the coupling member 130 is a member for coupling the reinforcement member 110 and the over slam bumper 120.

As illustrated in FIGS. 2 and 4, the coupling member 130 may include a bolt that may screw-couple the reinforcement member 110 and the over slam bumper 120. However, the present invention is not limited thereto, but the coupling member 130 may include any one of various members that may couple the reinforcement member 110 and the over slam bumper 120. Hereinafter, a case in which the coupling member 130 includes a bolt will be described below as an example of the present invention.

The coupling member 130 may include a head part 131 and a screw part 132.

The head part 131 has a shape of a flange, and has a diameter that is greater than those of the first bolt hole 111 and the second bolt hole 124. The screw part 132 extends from the head part 131, and has a screw thread formed on an external peripheral surface thereof.

As illustrated in FIG. 2, the head part 131 of the coupling member 130 is located in the internal of the reinforcement member 110 and the screw part 132 of the coupling member 130 passes through the first bolt hole 111 and protrudes towards the vehicle body 20 wherein the head part 131 is fixed to an internal surface of the reinforcement member 110 through welding, but the present invention is not limited thereto. The second bolt hole 124 of the over slam bumper 120 may be coupled to the screw part 132 protruding towards the vehicle body 20, and through this, the coupling member 130 may screw-couple the reinforcement member 110 and the over slam bumper 120.

Next, the support member 140 is a member for supporting the over slam bumper 120 from the vehicle body 20 when the door is closed.

The support member 140 may include a grommet that is detachably provided in the second insertion hole 21 of the vehicle body 20. However, the present invention is not limited thereto, but the support member 140 may include any one of various members that may be coupled to the second insertion hole 21. Hereinafter, a case in which the support member 140 includes a grommet will be described below as an example of the present invention.

The support member 140 has a flat plate shape that is provided to contact the second portion 122 of the over slam bumper 120 when the door is closed. The support member 140 may include at least one stopping hook 141 formed on one surface thereof to be coupled to the internal peripheral surface of the second insertion hole 21 to be stopped by the second insertion hole 21. Accordingly, as illustrated in FIGS. 2 and 4, the support member 140 is mounted in the second insertion hole 21 by the stopping hook 141 to be separable from the second insertion hole 21. As such, the support member 140 supports the second portion 122 of the over slam bumper 120 from the vehicle body 20 when the door is closed, and the second insertion hole 21 is closed by the support member 140. The support member 140 may efficiently prevent curving of the vehicle body as compared with the case in which a contact part supporting the over slam bumper 120 is directly formed in the vehicle body 20.

Hereinafter, operational aspects of the over slam bumper assembly 1 will be described according to states of the vehicle.

First, as illustrated in FIG. 4, when the door is opened, the door panel 10 is rotated in a direction in which the door panel 10 becomes farther from the side external member 22. Accordingly, the over slam bumper 120 does not contact the support member 140.

Next, as illustrated in FIG. 2, when the door is closed, the door panel 10 is rotated in a direction in which the door panel 10 becomes closer to the side external member 22. Accordingly, the over slam bumper 120 elastically contacts the support member 140, and the support member 140 supports the over slam bumper 120 from the vehicle body 20.

Next, when a lateral collision occurs while the door is closed, the reinforcement member 110 is deformed towards the side external member 22 as illustrated in FIG. 5. Accordingly, the over slam bumper 120 presses the support member 140 with a force that is strong as compared with the case in which the door is closed, and the support member 140 is separated from the second insertion hole 21 while being deformed by the over slam bumper 120. As such, as the door panel 10 is stopped by the vehicle body 20 while the second portion 122 of the over slam bumper 120 is inserted into the second insertion hole 21, an intrusion degree by which the door panel 10 and the reinforcement member 110 intrude towards the internal of the vehicle may be reduced. Accordingly, because the over slam bumper assembly 1 may reduce the intrusion degree of the door even though the hook structure mounted on the door panel, which has been described in the related art, to reduce the intrusion degree of the door, the manufacturing costs and weight of the vehicle may be reduced as compared with the case in which the hook structure is provided.

Figure 6:
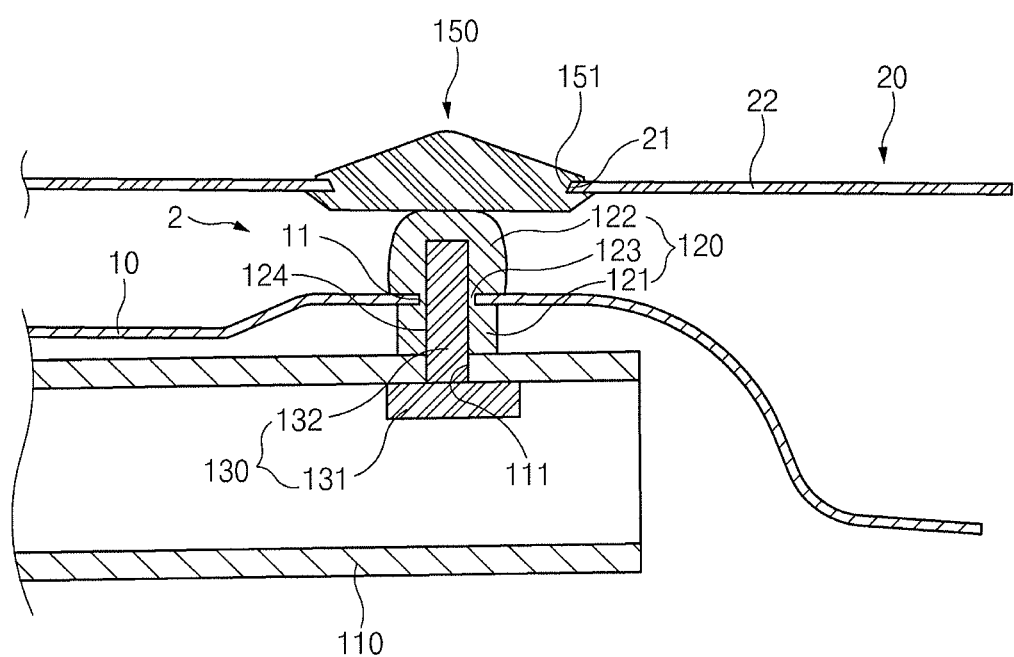
FIG. 6 is a sectional view illustrating a state in which a door of a vehicle, in which an over slam bumper assembly according to another exemplary embodiment of the present invention is disposed.
Figure 7:
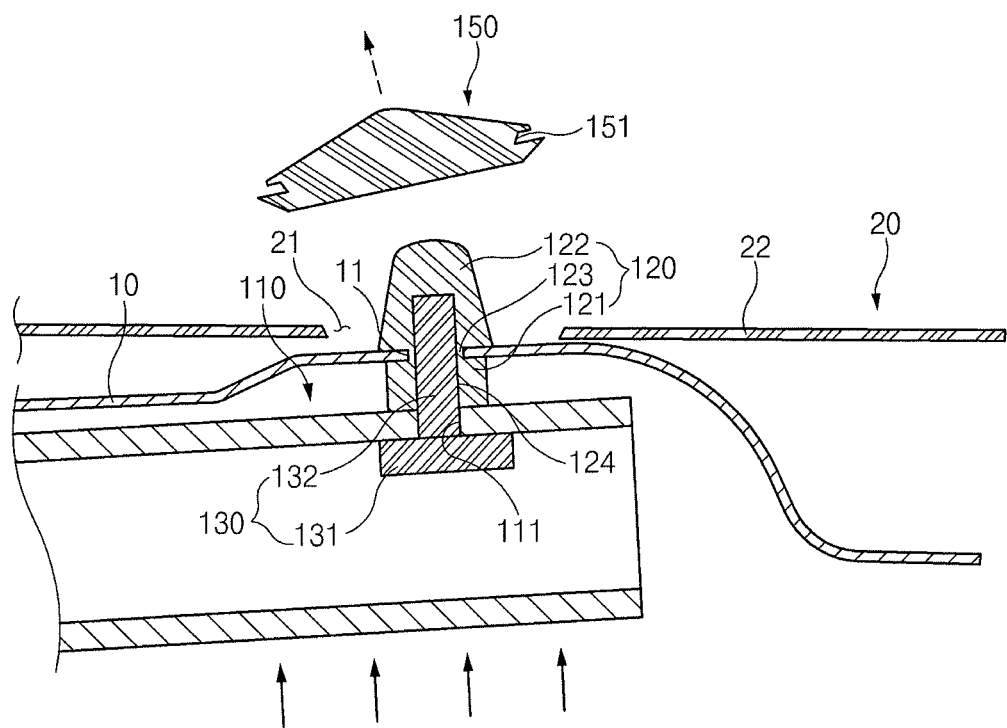
FIG. 7 is a sectional view illustrating a state in which a lateral collision occurs in the door of the vehicle of FIG. 6.

FIG. 6 is a sectional view illustrating a state in which a door of a vehicle, in which an over slam bumper assembly according to another exemplary embodiment of the present invention is disposed. FIG. 7 is a sectional view illustrating a state in which an external impact is applied to the door of the vehicle of FIG. 6.

The over slam bumper assembly 2 according to the various exemplary embodiments of the present invention is different form the over slam bumper assembly 1, which has been already described in the shape of the support member 150, and the other contents thereof are the same as those of the above-described over slam bumper assembly 1.

The support member 150 may include a second insertion groove 151 that is recessed on an external peripheral surface thereof to be inserted into and coupled to the internal peripheral surface of the second insertion hole 21. Accordingly, as illustrated in FIG. 6, the support member 150 is mounted in the second insertion hole 21 through the second insertion groove 151 to be separable from the second insertion hole 21 to support the second portion 122 of the over slam bumper 120 from the vehicle body 20 when the door is closed, and the second insertion hole 21 is closed by the support member 150. Further, as illustrated in FIG. 7, when a lateral collision occurs, the support member may be pressed by the second portion 122 of the over slam bumper 120 to be separated from the second insertion hole 21, and the second portion 122 of the over slam bumper 120 may be inserted into the second insertion hole 21.

The detailed operational aspects of the over slam bumper assembly according to the various exemplary embodiments of the present invention are the same as those of the above-described over slam bumper assembly, and accordingly, a detailed description thereof will be omitted.

The over slam bumper assembly according to an exemplary embodiment of the present invention has the following effects.

First, the present invention may alleviate an impact and noise when a door is closed through an over slam bumper and reduce an intrusion degree of the door when a lateral collision occurs, by mounting the over slam bumper between the reinforcement member of the door and the vehicle body.

Second, the present invention may improve an external design of the vehicle as compared with a case in which a contact part supporting an over slam bumper is directly formed, by separately mounting a support member supporting an over slam bumper on the vehicle body.

The above description is a simple exemplification of the technical spirit of the present invention, and the present invention may be variously corrected and modified by those skilled in the art to which the present invention pertains without departing from the essential features of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An over slam bumper assembly comprising:
    a reinforcement member mounted on a door panel; and
    an over slam bumper including a first portion disposed between the door panel and the reinforcement member and a second portion disposed between the door panel and a vehicle body to contact the vehicle body when a door is closed,
    wherein the over slam bumper further includes a third portion connecting the first portion and the second portion and inserted into a first insertion hole formed in the door panel.

2. The over slam bumper assembly of claim 1, wherein the third portion has a first insertion groove formed on an external peripheral surface thereof, and wherein an internal peripheral surface of the first insertion hole is fitted with and coupled to the external peripheral surface of the third part.

3. The over slam bumper assembly of claim 1, further including:
    a coupling member coupling the over slam bumper and the door panel.

4. The over slam bumper assembly of claim 3, wherein the coupling member includes a bolt screw-coupling the over slam bumper and the door panel.

5. The over slam bumper assembly of claim 4, wherein the reinforcement member includes a first bolt hole punched such that a screw part of the coupling member is coupled to the first bolt hole, and
    wherein the over slam bumper includes a second bolt hole punched such that the screw part of the coupling member is coupled to the second bolt hole.

6. The over slam bumper assembly of claim 1, wherein the over slam bumper is formed of an elastic material that is elastically deformed.

7. The over slam bumper assembly of claim 1, further including:
    a support member mounted on the vehicle body to contact the second portion when the door is closed.

8. The over slam bumper assembly of claim 7, wherein the support member is mounted in a second insertion hole formed in the vehicle body to be separable from the second insertion hole.

9. The over slain bumper assembly of claim 8, wherein the support member includes at least one stopping hook formed on a surface thereof to be coupled to an internal peripheral surface of the second insertion hole to be stopped.

10. The over slam bumper assembly of claim 8, wherein the second portion has a second insertion groove formed on an external peripheral surface thereof, and wherein an internal peripheral surface of the second insertion hole is fitted with and coupled to the external peripheral surface of the support member.

11. The over slam bumper assembly of claim 8, wherein the second portion has an external diameter that is a same as or smaller than an internal diameter of the second insertion hole.

* * * * *